US007309140B2

(12) United States Patent
Huang

(10) Patent No.: US 7,309,140 B2

(45) Date of Patent: Dec. 18, 2007

(54) LIGHT FOR JACK

(75) Inventor: Tony Huang, Taichung (TW)

(73) Assignee: Hiever Co., Ltd. (TW)

( * ) Notice: Subject to any disclaimer, the term of this patent is extended or adjusted under 35 U.S.C. 154(b) by 20 days.

(21) Appl. No.: 11/295,434

(22) Filed: Dec. 7, 2005

(65) Prior Publication Data

US 2007/0127243 A1 Jun. 7, 2007

(51) Int. Cl.

| | |
|---|---|
| ***F21L 4/00*** | (2006.01) |
| ***F21V 33/00*** | (2006.01) |
| ***F21V 21/096*** | (2006.01) |
| ***F21S 8/00*** | (2006.01) |
| ***B60Q 1/00*** | (2006.01) |

(52) U.S. Cl. ...................... 362/191; 362/253; 362/398; 362/430; 362/190; 362/486

(58) Field of Classification Search ................ 362/528, 362/529, 543, 544, 545, 253, 119, 120, 135–144, 362/194, 195, 197–201, 202, 398, 457, 458, 362/459, 427, 109, 208, 157, 103, 116, 285, 362/286, 250, 188, 418, 269, 216, 368, 369, 362/370, 371, 184, 190, 191, 430; D26/60, D26/61, 63, 65, 51, 56; D8/31, 106; 254/45

See application file for complete search history.

(56) References Cited

U.S. PATENT DOCUMENTS

| | | | | |
|---|---|---|---|---|
| 1,367,369 | A * | 2/1921 | Friend | 248/688 |
| 4,075,470 | A * | 2/1978 | Moore | 362/287 |
| 4,506,317 | A * | 3/1985 | Duddy | 362/396 |
| 4,897,768 | A * | 1/1990 | Thul | 362/191 |
| 5,331,904 | A * | 7/1994 | DiSimone et al. | 108/44 |
| 5,491,621 | A * | 2/1996 | Duty | 362/397 |
| 5,523,929 | A * | 6/1996 | Ogihara | 362/183 |
| 5,595,441 | A * | 1/1997 | McGee | 362/473 |
| 6,644,827 | B2 * | 11/2003 | Birdwell | 362/202 |
| 6,644,829 | B1 * | 11/2003 | Tracy et al. | 362/220 |
| 2003/0043581 | A1 * | 3/2003 | Finnigan | 362/253 |

* cited by examiner

*Primary Examiner*—Jong-Suk (James) Lee
*Assistant Examiner*—David Crowe
(74) *Attorney, Agent, or Firm*—Browdy and Neimark, PLLC

(57) ABSTRACT

A light for a jack includes a housing having a chamber therein to receive a battery set, two pivot portions at two exterior sides thereof and a light portion at a top thereof. Two pivot devices are pivoted on the pivot portions of the housing respectively to be moved to change an angle relative to the housing. Each of the pivot devices is provided with a magnet to couple the pivot devices with the jack by a magnetic force of the magnets.

9 Claims, 6 Drawing Sheets

LIGHT FOR JACK

BACKGROUND OF THE INVENTION

1. Field of the Invention

The present invention relates generally to an illuminating device, and more particularly to a light for a jack.

2. Description of the Related Art

An engineer usually operates a jack to lift a car for repair. The space under the car is low and dark requiring the engineer to lie on the ground to locate a position to place the jack. One can use a light to illuminate the working space. However, the engineer must use one hand to hold the jack and the other hand to maintain his position so there is no hand free to hold the light. Even if there is a light illuminating the space between the bottom of the car and ground, it is hard to illuminate the space at the location the engineer wants.

SUMMARY OF THE INVENTION

The primary objective of the present invention is to provide a light for use on a jack for illumination of the space under the car when a jack to lift the car.

The secondary objective of the present invention is to provide a light for a jack which illuminates the jack for movement under the car.

According to the objectives of the present invention, the light includes a housing having a chamber therein to receive a battery set, two pivot portions on each of two exterior sides thereof, a light portion at a top thereof, and two pivot devices pivoted on the pivot portions of the housing respectively to be moved to change an interior angle relative to the housing, each of the two pivot portions being provided with a magnet to couple the pivot devices with the jack by a magnetic force of the magnets.

DETAILED DESCRIPTION OF THE INVENTION

Figure 1:
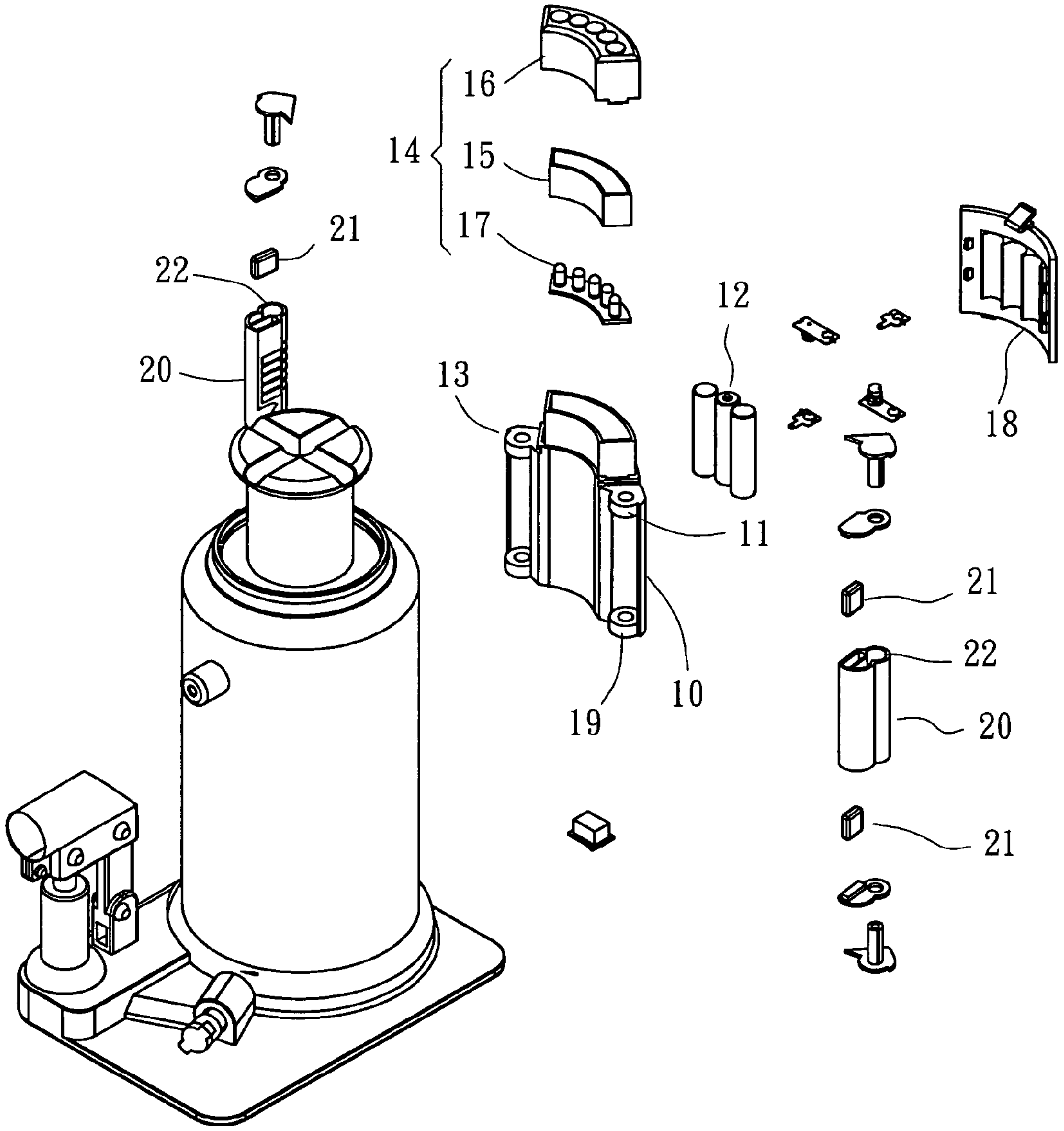
FIG. 1 is an exploded view of a first preferred embodiment of the present invention.
Figure 2:
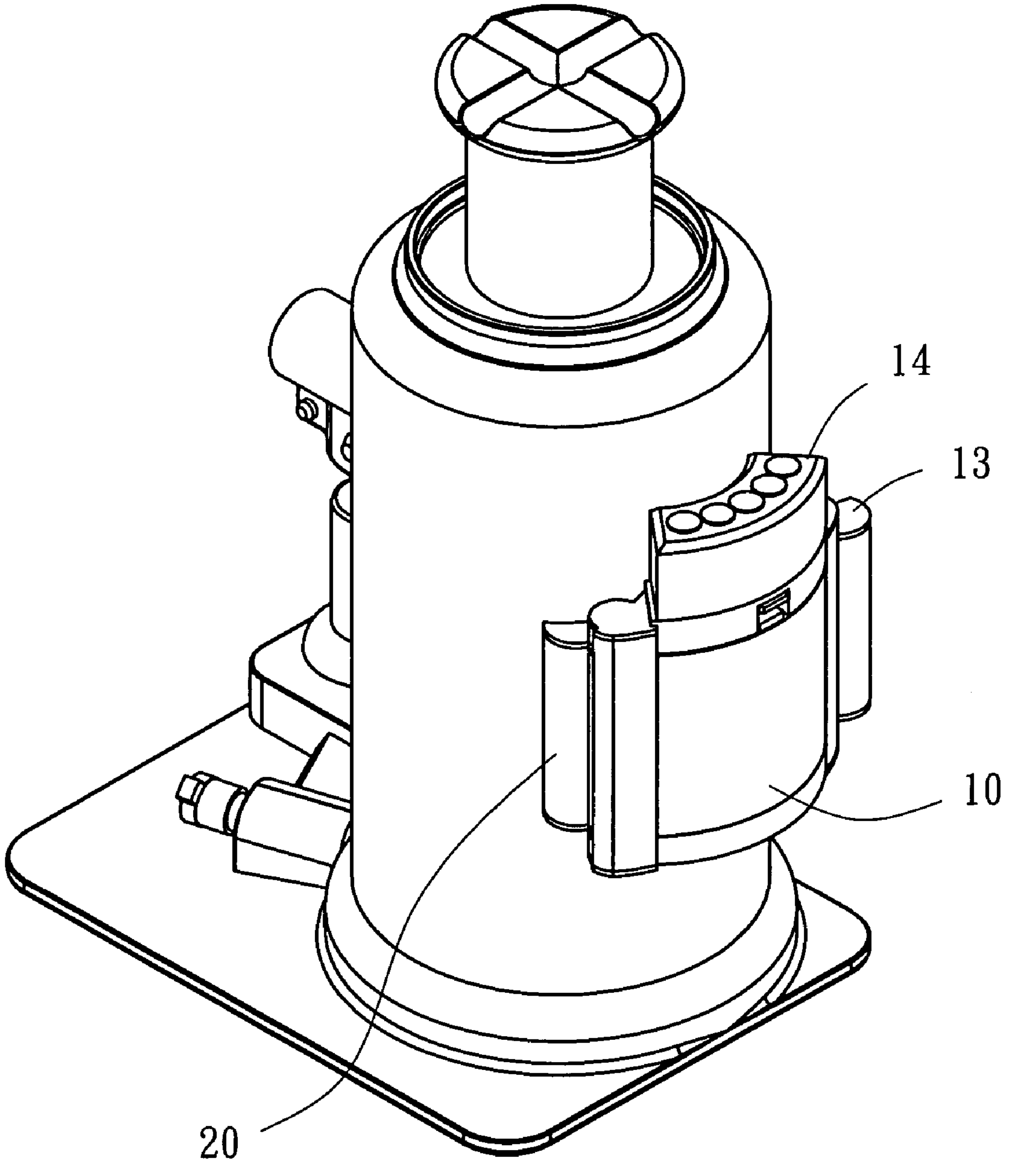
FIG. 2 is a perspective view of the first preferred embodiment of the present invention.
Figure 3B:
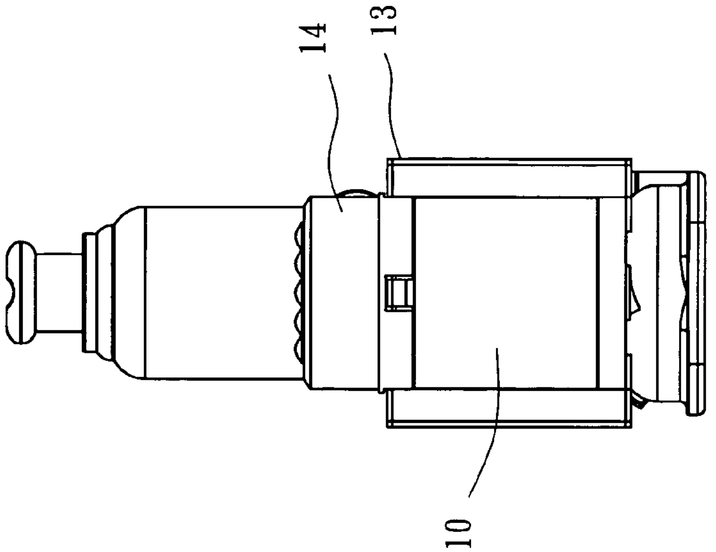
FIG. 3 is a lateral view of the first preferred embodiment of the present invention.
Figure 3A:
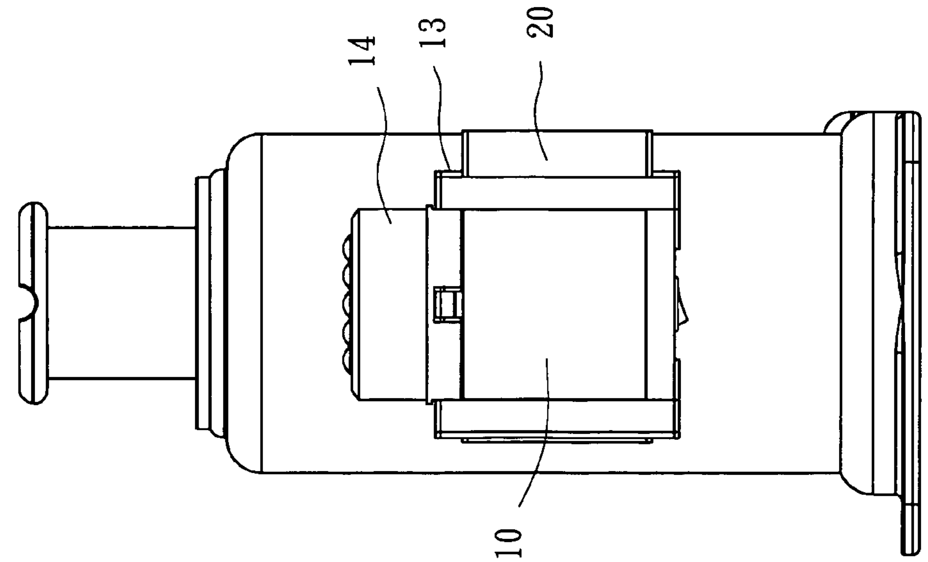
Figure 4A:
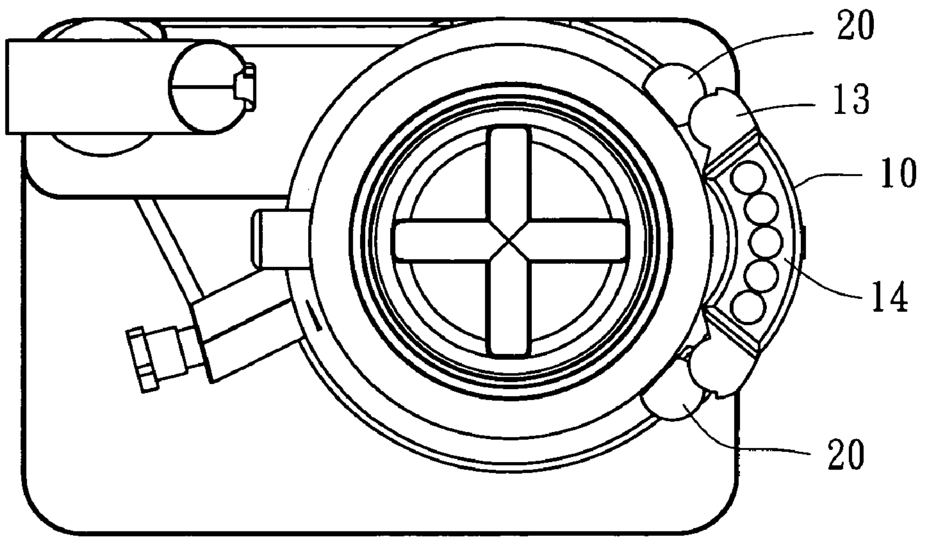
FIG. 4 is a top view of the first preferred embodiment of the present invention.
Figure 4B:
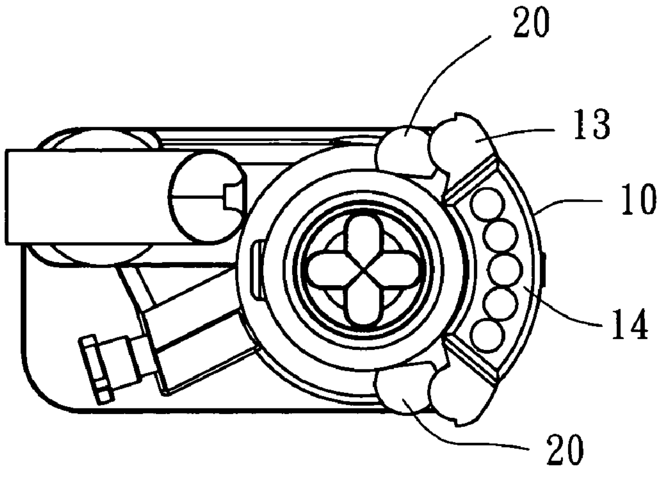

As shown in FIG. 1 to FIG. 4, a light for a jack of the first preferred embodiment of the present invention comprises:

A housing 10 includes a chamber 11 with a battery set 12 received therein, and two pivot portions 13 at opposite sides thereof, and a light portion 14 at a top thereof. The light portion 14 includes a reflection member 15, a lens set 16 and a plurality of lamps 17. In the present embodiment, the housing is a curved member having the chamber 11 therein and a cover 18 to close the chamber 11. The battery set 12 is received in the chamber 11 to supply power. The housing

10 is provided with the light portion 14, which uses light emitting diodes (LED) as the light source, on the top of housing 10. Each of the pivot portions 13 on the opposite sides of the housing 10 COMPRISING two bulging pivot bases 19 respectively separated at a top and bottom end of the sides of the housing 10.

Two pivot devices 20 are pivoted on the pivot portions 13 of the housing 10 respectively for free rotation. Each of the pivot devices 20 is provided with a magnet 21 to couple the pivot devices 20 with the jack. In the present embodiment, the pivot devices 20 are two elongated blocks, each of which has an aperture 22 on a top and bottom respectively. The apertures 22 are engaged with the pivot bases 19 to pivot the pivot devices 20 on the housing 10.

With the above, the present invention can be fixed to the jack by the magnets 21 on the pivot devices 20. The housing 10 may be adjusted on the jack to illuminate the portions of the car held up by the jack. Because the housing 10 is pivotable on the pivot devices 20, the angle of the housing 10 can be adjusted relative to the housing 10 for various sizes of jacks. FIGS. 3A, 3B, 4A and 4B shows jacks of different sizes and the light of the present invention mounted thereon and adjusted to a desired angle according to the size of the jack. The light of the present invention does not interfere with the work of the jack. As a result, the illumination when facilitates the to engineer's work.

Figure 5:
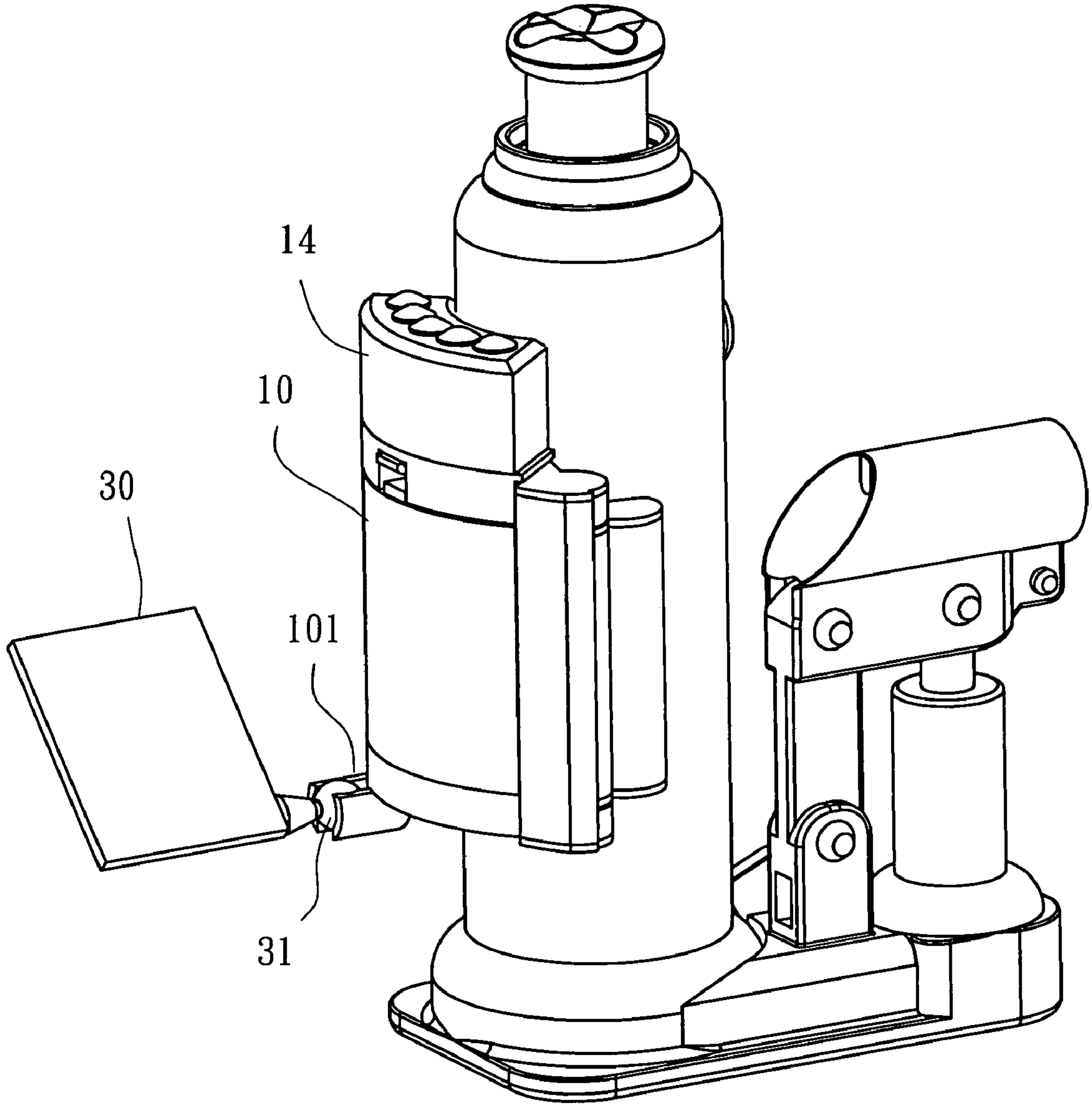
FIG. 5 is a perspective view of a second preferred embodiment of the present invention.
Figure 6:
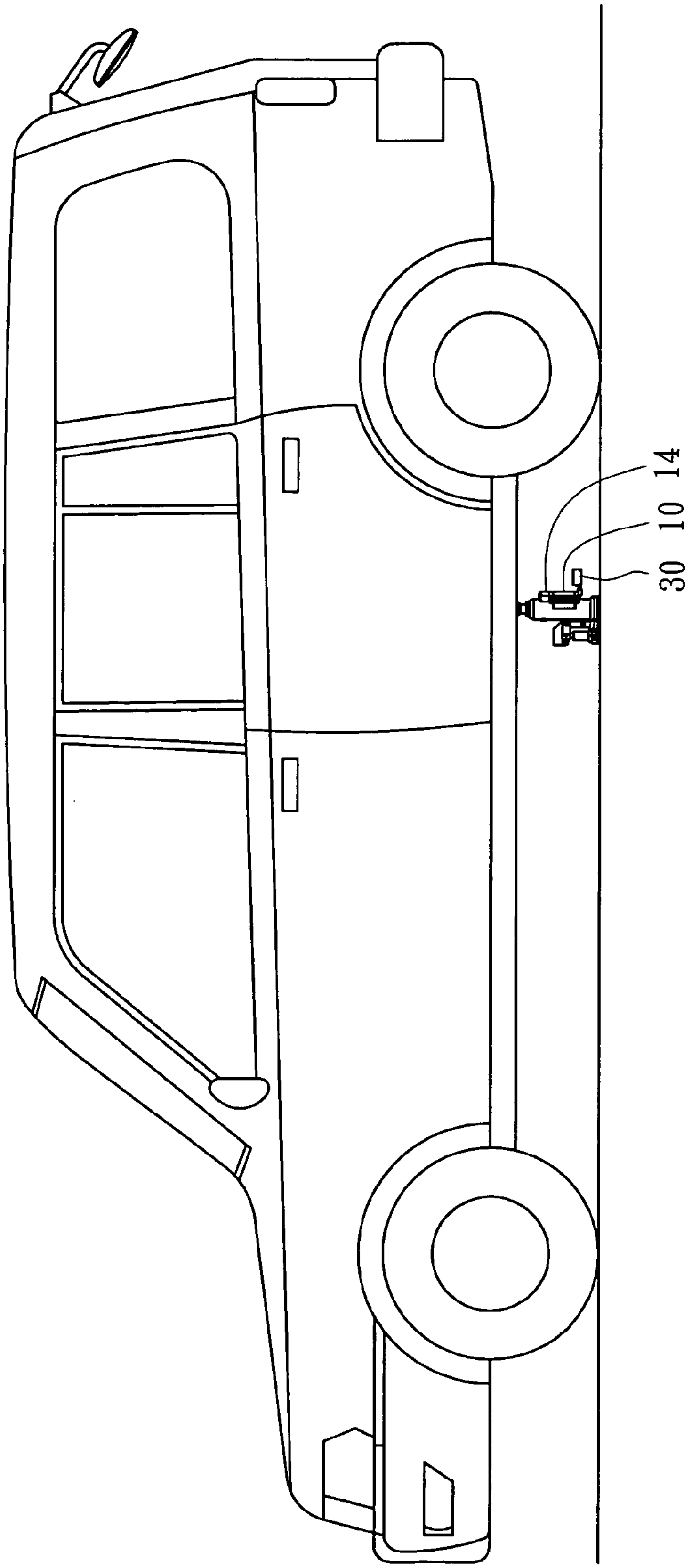
FIG. 6 is sketch diagram of the second preferred embodiment of the present invention in operation.

As shown in FIG. 5 and FIG. 6, a second preferred embodiment of the present invention provides a light, which is similar to the first preferred embodiment, except that the housing 10 is provided with a mirror 30. In this embodiment, the housing 10 has a recess 101, and the mirror 30 has a ball 31 to be received in the recess 101 to pivot the mirror 30 on the housing 10. The mirror 30 can adjust the angle for the engineer to better see the working space via the mirror 30, so that the engineer has no longer to squeeze his/her body into the narrow space under the car to verify the operating condition of the jack.

What is claimed is:

1. A light for engagement to a jack, comprising:

a housing having a chamber therein to receive a battery set, two pivot portions respectively located at two exterior surfaces thereof and a light portion at a top thereof; and two pivot devices respectively pivoted on the pivot portions of the housing moveable to change an angle relative to the housing, each of which is provided with a magnet to couple the pivot devices with the jack by a magnetic force of the magnets;

wherein each of the pivot portions has two bulking pivot bases respectively located at a top end and bottom end of a corresponding surface of said two exterior surfaces of the housing.

2. The light as defined in claim 1, further comprising a mirror pivoted with respect to the housing.

3. The light as defined in claim 2, wherein the housing has a recess and the mirror has a ball received in the recess.

4. The light as defined in claim 1, wherein each of the pivot devices has an elongated block, which respectively has an aperture on a top and a bottom to be engaged with the pivot bases to pivot the pivot devices on the housing.

5. The light as defined in claim 1, wherein the housing is a curved member, and the pivot portions are on two ends of the curved member.

6. A light for engagement to a jack, comprising:

a housing having a chamber therein to receive a battery set, two pivot portions respectively located at two exterior surfaces thereof and a light portion at a top thereof; and two pivot devices respectively pivoted on the pivot portions of the housing moveable to change an angle relative to the housing, each of which is provided with a magnet to couple the pivot devices with the jack by a magnetic force of the magnets, wherein each of the pivot portions has two bulking pivot bases respectively located at a top end and a bottom end of a corresponding surface of said two exterior surfaces of the housing; further comprising a mirror pivoted with respect to the housing.

7. The light as defined in claim 6, wherein the housing has a recess and the mirror has a ball received in the recess.

8. The light as defined in claim 6, wherein each of the pivot devices has an elongated block, which respectively has an aperture on a top and a bottom to be engaged with the pivot bases to pivot the pivot devices on the housing.

9. The light as defined in claim 6, wherein the housing is a curved member, and the pivot portions are on two ends of the curved member.

* * * * *